(12) United States Patent
Li et al.

(10) Patent No.: US 9,410,037 B2
(45) Date of Patent: Aug. 9, 2016

(54) CRYSTALLINE LATEX PRODUCTION

(71) Applicant: Xerox Corporation, Norwalk, CT (US)

(72) Inventors: Shigeng Li, Penfield, NY (US); Yanjia Zuo, Rochester, NY (US); Shigang Qiu, Toronto (CA); Peter V Nguyen, Webster, NY (US); Chieh-Min Cheng, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/561,464

(22) Filed: Dec. 5, 2014

(65) Prior Publication Data

US 2016/0160046 A1 Jun. 9, 2016

(51) Int. Cl.
| | |
|---|---|
| G03G 9/08 | (2006.01) |
| C08L 79/08 | (2006.01) |
| G03G 9/087 | (2006.01) |
| C08L 67/02 | (2006.01) |
| C08L 77/06 | (2006.01) |
| C08J 3/07 | (2006.01) |

(52) U.S. Cl.
CPC .. *C08L 79/08* (2013.01); *C08J 3/07* (2013.01); *C08L 67/02* (2013.01); *C08L 77/06* (2013.01); *G03G 9/0806* (2013.01); *G03G 9/08755* (2013.01); *G03G 9/08766* (2013.01)

(58) Field of Classification Search
CPC ...... G03G 9/08755; G03G 9/0806; C08J 3/07
USPC ......................................... 430/109.4, 137.15
See application file for complete search history.

(56) References Cited

U.S. PATENT DOCUMENTS

| | | | |
|---|---|---|---|
| 8,192,913 B2 | 6/2012 | Faucher et al. | |
| 8,338,071 B2 | 12/2012 | Qiu et al. | |
| 9,267,032 B1 | 2/2016 | Li et al. | |
| 2011/0281216 A1* | 11/2011 | Qiu | ............................ C08J 3/07 430/137.14 |

* cited by examiner

*Primary Examiner* — Mark A Chapman
(74) *Attorney, Agent, or Firm* — Marylou J. Lavoie, Esq. LLC

(57) ABSTRACT

A process for making a crystalline latex suitable for use in a toner by phase inversion emulsification (PIE) where the liquid reagents, such as, organic solvent(s), neutralizing agent and water, are reused from a prior PIE.

19 Claims, No Drawings

CRYSTALLINE LATEX PRODUCTION

FIELD

The present disclosure relates to producing crystalline latex useful in making toner using a solvent reuse phase inversion emulsification (PIE) processes.

BACKGROUND

Latex emulsions of resins may be produced using PIE processes in which resins are dissolved in a mixture of water, a base and organic solvent(s) (e.g., methyl ethyl ketone (MEK), isopropyl alcohol (IPA) or both) to form a water-in-oil (W/O) dispersion (i.e., water droplets dispersed in continuous oil). Subsequently, water is added to convert the dispersion into an oil-in-water (O/W) dispersion. In embodiments, liquids from a prior PIE can be reused in a subsequent PIE.

Amorphous polyester latexes may be produced in a solvent reuse process with organic distillate from a previous PIE. The solvent(s), such as, methyl ethyl ketone (MEK) and isopropyl alcohol (IPA), from a latex emulsion can be distilled under vacuum and be used as solvent of a resin in a subsequent PIE. Solvent reuse processes provide savings in raw material, solvents(s), cost and solvent disposal fees, leading to significant reduction, of production cost.

When IPA is used as a solvent, particle size of amorphous resins is determined primarily by the amount of IPA. When ammonium hydroxide or ammonia is used as the base, the amount of ammonium hydroxide or ammonia impacts the neutralization ratio of crystalline polyester (CPE) resins and CPE particle size. Thus, for CPE PIE, where an objective is to employ solvent reuse and to avoid solvent disposal fees, base amounts must be considered and carefully controlled.

SUMMARY

The instant disclosure describes solvent reuse processes to obtain crystalline polyester (CPE) latex using phase inversion emulsification (PIE) where liquids from a PIE are removed and reused in a subsequent PIE.

In embodiments, a method of PIE is disclosed including: adding to an organic mixture comprising a first concentration of solvent(s) and a base, an optional second concentration of solvent(s) and a base, and optionally water, to form a solvent mixture; dissolving a first crystalline polyester (CPE) resin having one or more acid groups in the solvent mixture to form a dispersion; neutralizing the one or more acid groups by adding a base to the dispersion to form a neutralized dispersion; and adding an aqueous mixture to the neutralized dispersion to phase inverse the neutralized dispersion to form an oil-in-water emulsion comprising a first CPE latex.

In embodiments, a PIE method is disclosed including: adding to an organic mixture comprising a first concentration of methyl ethyl ketone (MEK), isopropyl alcohol (IPA) and a base, such as, ammonium hydroxide, an optional second concentration of MEK, IPA or ammonium hydroxide, and optionally water, to form a solvent mixture; dissolving a first crystalline polyester (CPE) resin having one or more acid groups in the solvent mixture to form a dispersion; neutralizing the one or more acid groups by adding ammonium hydroxide to the dispersion to form a neutralized dispersion; adding an aqueous mixture to the neutralized dispersion to phase inverse the neutralized dispersion to form an oil-in-water (O/W) emulsion comprising a first CPE latex. The O/W emulsion is treated to remove the organic solvents to form an organic mixture and to remove the aqueous liquids to form an aqueous mixture, either or both of which can be used in a subsequent PIE to dissolve resin and to phase inverse the water-in-oil (W/O) emulsion.

DETAILED DESCRIPTION

It was discovered that polyester latexes may be produced in a PIE using liquids from a prior PIE. In the process, the polyester resin may be dissolved in a mixture of, for example, dual solvents (e.g., methyl ethyl ketone (MEK) and isopropanol (IPA)), deionized (DI) water (DIW) and a base, such as, ammonia or ammonium hydroxide. A second quantity of base then may be added to the mixture to neutralize further the acid groups on the polyester chains, followed by addition of a second quantity of DIW to generate a uniform suspension of polyester particles in a water continuous phase via phase inversion. Solvents and water then are removed to produce a latex with the extracted liquids used in a subsequent PIE.

When the fluids are removed by distillation, for example, optionally, under vacuum, although other separation methods can be used, such as, chromatography, centrifugation and so on, the distillate may be separated into two parts, distillate I containing primarily organic solvent(s) and distillate II containing primarily water, according to the chemical concentration of each fraction monitored, for example by gas chromatography (GC). In the case where the resin is dissolved in a mixture of MEK and IPA using ammonia as the neutralizing agent, distillate I contains higher concentrations of MEK, IPA and ammonia, which may be used to dissolve resin in a subsequent PIE, which distillate I may be compensated with fresh solvent(s) and ammonia as needed or as a design choice. The majority of distillate II is water with a minimum of solvent(s) and ammonia. Then, distillate II is mixed with any water or other reagents as needed or as a design choice and is added to the resin emulsion to obtain phase in version of the dissolved resin emulsion. Thus, distillates can be used continuously from one reaction to a successive PIE reaction or reactions, sequentially and repeatedly, resulting in reduction in production cost and almost zero release of hazardous materials to the environment.

To exploit more fully solvent reuse for CPE derived latexes, and to save on raw materials (such as, MEK and IPA) cost and reducing solvent disposal fees, the entire distillate of a PIE reaction should be reused in a subsequent PIE reaction. Since base concentration or amount, such as, ammonium hydroxide (or ammonia), determines the neutralization ratio of CPE and primarily influences CPE latex particle size, the amount of base or neutralizing agent in distillates and in a PIE reaction must be addressed.

When a solvent reuse process for CPE latex is considered, three parts of base are involved—base, such as, ammonia, in distillate I (Base I or in this case, Amm I); fresh base, such as, ammonia charged during the PIE (Base II or in this case, Amm II); and base, such as, ammonia in distillate II (Base III or in this case, Amm III). The relationship among those three ammonia additions and the final latex particle size was ascertained to develop a robust reuse process for making CPE latex of predetermined particle size. Since distillate I is rich in solvents (that is, more than 50% by weight or volume of distillate I is solvent), for example, MEK and IPA, with amounts of base, and may be used to dissolve CPE resin, handling of the base in distillate II and/or the tolerance of a CPE latex PIE process to total ammonia concentration are critical for implementing a CPE solvent reuse PIE process. Ideally, Amm III, which comes from distillate II and increases the total neutralization ratio based on Amm I and II, is added to the reaction to avoid solvent disposal fees. Therefore, the maximum ammonia concentration that the PIE process may accommodate without impacting CPE latex particle size to ensure full exploitation of the solvent reuse process was determined.

In embodiments, the process and formulation include the steps of: dissolving CPE resin at a certain temperature in distillate I, which can be a mixture of solvents (such as, MEK and IPA), base and DIW. The base neutralizes some or all acid groups of the resin to promote dispersion of the resin. After resin is dissolved and forms a dispersion, a larger amount of base is added to neutralize further resin acid groups. Then, to convert the resin dispersion into latex, preheated DIW II is added to the dissolved resin mixture with mixing to complete phase inversion. In one aspect, presence of base in distillate II (sometimes up to 0.1 wt %) may be or is ignored in the calculation of total ammonia amount.

The CPE latex particle size may be controlled by adjusting the formulation (solvent to water ratio and neutralization ratio of polyester resin) and the process parameters (batch temperature, mixing condition and distillate II feeding temperature and rate).

CPE resin neutralization ratio primarily is based on Base I (from Distillate I) and Base II (fresh charged base). Base III has minimal impact on final CPE particle size, and hence, may be ignored. Considering the high sensitivity of CPE particle size to base amount, both Distillates I and II can be used in a CPE PIE and only Base I and II are considered for calculating the resin neutralization ratio. Reused base amount and resin neutralization ratio are used to control CPE latex particle size.

Any suitable CPE resin containing acid groups may be used. Any suitable base reagents may be used in the process disclosed herein. In embodiments, the base may be ammonium hydroxide. Other base reagents, such as, KOH, NaOH, NaHCO$_3$, Na$_2$CO$_3$ and the like may be used.

The resulting resin particles optionally can be washed, for example, with DIW, then dried or suspended in a fluid, such as, DIW, to form a latex.

Unless otherwise indicated, all numbers expressing quantities and conditions, and so forth used in the specification and claims are to be understood as being modified in all instances by the term, "about." "About," is meant to indicate a variation of no more than 10% from the stated value. Also used herein is the term, "equivalent," "similar," "essentially," "substantially," "approximating," and, "matching," or grammatic variations thereof, have generally acceptable definitions or at the least, are understood to have the same meaning as, "about."

As used herein, "solvent reuse," is meant to include a primarily solvent portion of a PIE O/W emulsion as well as a primarily water portion of the O/W emulsion. The O/W emulsion can be configured to include solvents with, for example, boiling point(s) or other physical property different from that of water so that the solvents and water can be removed as different fractions from the O/W emulsion leaving the latex or resin particles for use, for example, in toner. Generally, the solvent portion includes the organic solvent(s) used to dissolve the resin as well as amounts of basic neutralizing agent and any optional surfactant, and possibly a trace or small amount of water. The water portion is dominated by water but can include small amounts of organic solvent(s), basic neutralizing agent and any optional surfactant. The solvent portion can be used as the organic mixture for dissolving resin in a PIE. The water portion can be used as the aqueous mixture for phase inversion in a PIE.

"Distillate," is used herein, as known, to include fluid removed from a liquid by a distillation process, which can occur under vacuum, bat also to include any fluid removed from an O/W emulsion resulting from PIE by any separation means or method, such as, chromatography, filtration, centrifugation and so on. Hence, a liquid phase, a solution, a fraction, a supernatant and so on is identical to and synonymous with a distillate herein. Thus, a distillate identifies a filtrate, a fraction and so on. The portions removed from the O/W emulsion are reused and are of at least two classes, the first is organic solvent-rich, that is, more than about 50% by weight or volume is organic solvent(s), and is used to dissolve resin in a subsequent PIE, which first portion can be supplemented with fresh reagent(s), as needed or as a design choice, for resin dissolution; and a second portion is water-rich, that, is, more than 50% by weight or volume is water, and is used in a subsequent PIE, which second portion can be supplemented with water, neutralizing agent and so on, as needed or as a design choice, to produce phase inversion of the W/O emulsion of a PIE into an O/W emulsion, which contains latex. The first portion is synonymous with, "solvent portion," "organic mixture," or, "Distillate I." The second portion is synonymous with, "water portion," "aqueous mixture," or, "Distillate II."

Currently, ultralow melt (ULM) polyester toners result in a benchmark minimum fix temperature (MFT) which is reduced by about 20° C. as compared to that of a conventional emulsion aggregation (EA) toner, which can be about 150° C. in embodiments, an ULM toner of the present disclosure may have an MFT of from about 100° C. to about 130° C., from about 105° C. to about 125° C., from about 110° C. to about 120° C.

Resins

Any resin may be utilized in forming a latex emulsion. The resin may be an amorphous resin or a crystalline resin. The resin may be a polyester resin, including the resins described, for example, in U.S. Pat. Nos. 6,593,049 and 6,756,176, the disclosure of each of which herein is incorporated by reference in entirety.

The resin may be a polyester resin formed by reacting a polyol with a poly acid in the presence of an optional catalyst.

The polyol may be, for example, selected in an amount of from about 40 to about 60 mole percent, from about 42 to about 55 mole percent. The polyacid may be selected in an amount of, for example, from about 40 to about 60 mole percent, from about 42 to about 52 mole percent.

Polycondensation catalysts may be utilized in forming either the crystalline or amorphous polyesters and include tetraalkyl titanates, dialkyltin oxides, such as, dibutyltin oxide, tetraalkyltins, such as, dibutyltin dilaurate, and dialkyltin oxide hydroxides, such as, butyltin oxide hydroxide, aluminum alkoxides, alkyl zinc, dialkyl zinc, zinc oxide, stannous oxide or combinations thereof. Such catalysts may be utilized in amounts of, for example, from about 0.01 mole percent to about 5 mole percent based on the starting polyacid or polyester used to generate the polyester resin.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as, poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(nonylene-decanoate), poly(octylene-adipate). Examples of polyamides include polyethylene-adipimide), poly(propylene-adipimide), poly(butylenes-adipimide), poly(pentylene-adipimide), poly(hexylene-adipimide), poly(octylene-adipimide), poly(ethylene-succinimide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide) and poly(butylene-succinimide).

Other suitable resins that can be used to make a latex comprise a styrene, an acrylate, such as, an alkyl acrylate, such as, methyl acrylate, ethyl acrylate, butyl acrylate, isobutyl acrylate, dodecyl acrylate, n-octyl acrylate, n-butylacrylate, 2-chloroethyl acrylate; β-carboxy ethyl acrylate (β-CEA), phenyl acrylate, methacrylate, butadienes, isoprenes, acrylic acids, acrylonitriles, styrene acrylates, styrene butadienes, styrene methacrylates, and so on, such as, methyl α-chloroacrylate, methyl methacrylate, ethyl methacrylate, butyl methacrylate, butadiene, isoprene, methacrylonitrile, acrylonitrile, vinyl ethers, such as, vinyl methyl ether, vinyl isobutyl ether, vinyl ethyl ether and the like; vinyl, esters, such as, vinyl acetate, vinyl propionate, vinyl benzoate and vinyl butyrate; vinyl ketones, such as, vinyl methyl ketone, vinyl hexyl ketone, methyl isopropenyl ketone and the like; vinylidene halides, such as, vinylidene chloride, vinylidene chlorofluoride and the like; N-vinyl indole, N-vinyl pyrrolidone, methacrylate, acrylic acid, methacrylic acid, acrylamide, methacrylamide, vinylpyridine, vinylpyrrolidone, vinyl-N-methylpyridinium chloride, vinyl naphthalene, p-chlorostyrene, vinyl chloride, vinyl bromide, vinyl fluoride, ethylene, propylene, butylene, isobutylene and mixtures thereof. A mixture of monomers can be used to make a copolymer, such as, a block copolymer, an alternating copolymer, a graft copolymer and so on.

An amorphous resin or combination of amorphous resins utilized in the latex may have a glass transition temperature (Tg) of from about 30° C. to about 80° C., from about 35° C. to about 70° C. In embodiments, the combined resins utilized in the latex may have a melt viscosity of from about 10 to about 1,000,000 Pa*S at about 130° C., from about 50 to about 100,000 Pa*S at about 130° C.

One, two or more resins may be used. In embodiments, when two resins are used, the resins may be in any suitable ratio (e.g., weight ratio), such, as, of from about 1% (first resin)/99% (second resin) to about 99% (first resin)/1% (second resin), in embodiments, from about 10% (first resin)/90% (second resin) to about 90% (first resin)/10% (second resin).

The weight ratio of the two amorphous resins may be from about 10% first amorphous resin/90% second amorphous resin, to about 90% first amorphous resin/10% second amorphous resin.

In embodiments, the resin may possess acid groups which, in embodiments, may be present at the terminus of a resin. Acid groups which may be present include carboxylic acid groups and the like. The number of acid groups may be controlled by adjusting the materials utilized to form the resin and reaction conditions.

In embodiments, the resin may be a polyester resin having an acid number from about 2 mg KOH/g of resin to about 200 mg KOH/g of resin, from about 5 mg KOH/g of resin to about 50 mg KOH/g of resin, from about 10 mg KOH/g of resin to about 15 mg KOH/g of resin, although the value can be outside of those ranges. The acid-containing resin may be dissolved in, for example, a tetrahydrofuran solution, and the acid number may be detected by titration with KOH/methanol solution containing phenolphthalein as indicator.

The resin particles of interest can be no greater than about 250 nm in size, that is, are about 225 nm or smaller, about 200 nm or smaller, about 175 nm or smaller in size, although a size outside of those ranges is acceptable.

Solvent

Any suitable organic solvent may be used to dissolve the resin, for example, alcohols, esters, ethers, ketones, amines and combinations thereof, in an amount of, for example, from about 30% by weight to about 400% by weight of the resin, from about 40% by weight to about 250% by weight of the resin, from about 50% by weight to about 100% by weight of the resin.

In embodiments, suitable organic solvents, sometimes referred to herein, in embodiments, as phase inversion agents, include, for example, methanol, ethanol, propanol, IPA, butanol, ethyl acetate, MEK and combinations thereof. In embodiments, the organic solvent may be immiscible in water and may have a boiling point of from about 30° C. to about 120° C. In embodiments when at least two solvents are used, the ratio of solvents can be from about 1:2 to about 1:15, from about 1:2.5 to about 1:12.5, from about 1:3 to about 1:10, from about 1:3.5 to about 1:7.5. Thus, if the first solvent is IPA and the second solvent is MEK, the ratio of IPA to MEK can be, for example, about 1:4.

Neutralizing Agent

In embodiments, the resin optionally may be mixed with a base or a neutralizing agent. In embodiments, the neutralizing agent may be used to neutralize acid groups in the resins, so a neutralizing agent herein may also be referred to as a, "basic agent," "basic neutralization agent," "base," or grammatic forms thereof. Any suitable basic neutralization reagent may be used in accordance with the present disclosure. In embodiments, suitable basic neutralization agents may include both inorganic basic agents and organic basic agents. Suitable basic agents may include ammonium hydroxide, potassium hydroxide, sodium, hydroxide, sodium carbonate, sodium bicarbonate, lithium hydroxide, potassium carbonate, combinations thereof and the like. A buffer can be used.

The basic agent may be utilized in an amount of from about 0.001% by weight to 50% by weight of the resin, from about 0.01% by weight to about 25% by weight of the resin, from about 0.1% by weight to 5% by weight of the resin. In embodiments, the neutralizing agent may be added in the form of an aqueous solution. In embodiments, the neutralizing agent may be added in the form of a solid. In embodiments, plural forms of bases are used in a process of interest. Hence, a process can comprise a first base and at a different or successive step, a second base is used. The first and second bases can be the same or different.

Utilizing the above basic neutralization agent in combination with a resin possessing acid groups, a neutralization ratio of from about 25% to about 300% may be achieved, from about 50% to about 200%. In embodiments, the neutralization ratio may be calculated as the molar ratio of basic groups provided with the basic neutralizing agent to the acid groups present in the resin multiplied by 100%.

As noted above, the basic neutralization agent may be added to a resin possessing acid groups. The addition of the basic neutralization agent thus may raise the pH of an emulsion including a resin possessing acid groups from about 5 to about 12, from about 6 to about 11. The neutralization of the acid groups may, in embodiments, enhance formation of an emulsion.

Surfactants

In embodiments, the process of the present disclosure optionally may include adding a surfactant, for example, before or during combining reagents, to the resin at an elevated temperature, in an emulsion, in a dispersion and so on.

Where utilized, an emulsion may include one, two or more surfactants. The surfactants may be selected from ionic surfactants and nonionic surfactants. Anionic surfactants and cationic surfactants are encompassed by the term, "ionic surfactants." In embodiments, the surfactant may be added as a solid or as a solution with a concentration of from about 5% to about 100% (pure surfactant) by weight, in embodiments, from about 10% to about 95% by weight. In embodiments, the surfactant may be utilized so is present in an amount of from about 0.01% to about 20% by weight of the resin, from about 0.1% to about 10% by weight.

Processing

The present process comprises forming a mixture by any known means, optionally, at an elevated temperature above room temperature, containing at least one resin, at least one organic solvent, optionally a surfactant, and optionally a neutralizing agent to form a latex emulsion.

In embodiments, the elevated temperature may be a temperature near to or above the $T_g$ of the resin(s).

In embodiments, an emulsion formed in accordance with the present disclosure includes water, in embodiments, deionized water (DIW) in amounts and at temperatures that melt or soften the resin, of from about 25° C. to about 120° C., from about 35° C. to about 80° C.

Thus, in embodiments, a process of the present disclosure may include contacting at least one resin with an organic solvent to form a resin mixture, heating the resin mixture to an elevated temperature, stirring the mixture, optionally adding a neutralizing agent to neutralize the acid groups of the resin, adding water in two portions into the mixture until phase inversion occurs to form a phase inversed latex emulsion, distilling the latex to remove a water solvent mixture in the distillate and producing a latex, such as, with a low polydispersity, a lower percentage of fines, coarse particles and so on.

In the phase inversion process, resin, such as, an amorphous and/or a combination of at least one amorphous and crystalline polyester resins may be dissolved in a low boiling point organic solvent, which solvent is miscible or partially miscible with water, such as, MEK, and any other solvent noted hereinabove, at a concentration of from about 1% by weight to about 75% by weight resin to solvent, from about 5% by weight to about 60% by weight resin in solvent. The resin mixture then is heated to a temperature of from about 25° C. to about 90° C., from about 30° C. to about 85° C. The heating need not be held at a constant temperature, but may be varied. For example, the heating may be increased slowly or incrementally until a desired temperature is achieved.

In accordance with processes as disclosed, a latex may be obtained using a more than one solvent PIE process which requires dispersing, phase inversing and removing steps. In that process, the resin may be dissolved in a combination of more than one organic solvents, for example, MEK and IPA, to produce a uniform organic mixture containing dissolved resin. Also, the fluids from one PIE process can be removed and reused in a subsequent PIE.

An amount of a base (such as, ammonium hydroxide) may be added to the organic phase to neutralize acid groups of the resin, such as, a crystalline resin.

Water is added in one or two portions to form a uniform dispersion of resin particles in water through phase inversion.

The organic solvents remain in both the resin particles and water phase following phase inversion. The liquid reagents can be removed from the O/W emulsion and from the resin particles practicing known materials and methods. Through vacuum distillation, for example, the organic solvent(s) can be stripped, and if the boiling point(s) of the organic solvent(s) is distinguishable from that of water, a portion of the water (as well as other water soluble compounds) can be distilled from the remaining emulsion or incipient latex.

In embodiments, the ratio of resin to two or more solvents (for example, MEK and IPA) may be from about 10:8 to about 10:12, from about 10:8.5 to about 10:11.5, from about 10:9 to about 10:11. When two solvents are used, and an LMW resin is included, the ratio of the LMW resin to the first and to the second solvents can be from about 10:6:1.5 to about 10:10:2.5. When an HMW resin is included with two solvents, the ratio of the HMW resin to the first and to the second solvents can be from about 10:8:2 to about 10:11:3, although amounts outside of those ranges noted above can be used.

The mixing temperature may be from about 35° C. to about 100° C., from about 40° C. to about 90° C., from about 50° C. to about 70° C.

Once the resins, optional neutralizing agent and optional surfactant are combined, the mixture then may be contacted with a first portion of a water, to form a W/O emulsion. Water then may be added to form an O/W emulsion including a latex with a solids content of from about 5% to about 60%, from about 10% to about 50%. While higher water temperatures may accelerate dissolution, latexes may be formed at temperatures as low as room temperature (RT). In embodiments, water temperatures may be from about 40° C. to about 110° C., from about 50° C. to about 90° C.

The amount of water comprising the first portion of water is an amount suitable to form a W/O emulsion. Phase inversion can occur at about a 1:1 w/w or v/v ratio of organic phase to aqueous phase. Hence, the first portion of water generally comprises less than about 50% of the total volume or weight of the final emulsion. The first portion of water can be less than about 95% of the volume or weight of the organic phase, less than about 85%, less than about 75% of the volume or weight of the organic phase. Lower amounts of water can be used in the first portion so long as a W/O emulsion is formed.

Phase inversion occurs on adding an optional aqueous alkaline solution or basic agent, optional surfactant and second portion of water to create a phase inversed emulsion including a dispersed phase of droplets possessing the molten ingredients of the resin composition and a continuous phase including the surfactant and/or water composition, where the second portion of water attains the phase inversion point (PIP) to form an O/W emulsion.

Combining may be conducted, in embodiments, utilizing any means within the purview of those skilled in the art. For example, combining may be conducted in a glass kettle with an anchor blade impeller, an extruder, i.e., a twin screw extruder, a kneader, such as, a Haake mixer, a batch reactor or any other device capable of intimately mixing viscous materials to create near or homogenous mixtures. The reaction can occur in a continuous reactor or a microreactor.

Stirring, although not necessary, may be utilized to enhance formation of the latex. Any suitable stirring device may be utilized. In embodiments, the stirring may be at a speed of from about 10 revolutions per minute (rpm) to about 5,000 rpm, from about 20 rpm to about 2,000 rpm, from about 50 rpm to about 1,000 rpm. The stirring need not be at a constant speed and may be varied. For example, as the heating of the mixture becomes more uniform, the stirring rate may be increased or decreased. In embodiments, a homogenizer (that is, a high shear device), may be utilized to form the phase inversed emulsion. When utilized, a homogenizer may operate at a rate of from about 3,000 rpm to about 10,000 rpm.

Although the PIP may vary depending on the components of the emulsion, the temperature of heating, the stirring speed and the like, phase inversion may occur when the optional basic neutralization agent, optional surfactant and water are added so that the resulting resin is present in an amount from about 5% by weight to about 70% by weight of the emulsion, from about 20% by weight to about 65% by weight, from about 30% by weight to about 60% by weight of the emulsion; or when the amount of water exceeds the amount of organic solvent(s).

Following phase inversion, additional optional surfactant, water and optional aqueous alkaline solution may be added to dilute the phase inversed emulsion, although not required. Following phase inversion, the emulsion may be cooled to room temperature (RT), for example, from about 20° C. to about 25° C.

In embodiments, separation methods, such as, distillation, optionally with stirring, optionally under a vacuum, of the O/W emulsion may be performed to remove the organic solvent(s) and optionally, the water, to provide resin particles with an average diameter size of less than about 250 nm, less than about 225 nm, less than about 200 nm.

The desired properties of the resin emulsion (i.e., particle size and low residual solvent level) may be achieved by adjusting the solvent and neutralizer concentration and process parameters (i.e., reactor temperature, vacuum and process time).

The coarse content of the latex of the present disclosure, that is, particles that are larger than most prevalent or desired population, of particles, may be from about 0.01% by weight to about 5% by weight, from about 0.1% by weight to about 3% by weight. The coarse content can be determining practicing known materials and methods, such as, using a Nanotrac analyzer or a Beckman Coulter MULTISIZER to obtain, for example, a cumulative size distribution of a particle population and from a graphical representation of the population obtain the $D_{84V}/D_{50V}$ ratio as a measure of the amount of coarse particles based on a statistical consideration of the population parameters and under certain statistical conditions, such as, confidence limits, standard deviation and so on, as known in the art.

The resin particles can be washed with DIW one or more times. The resin particles can be dried or stored in a fluid, such as, DIW.

Toner

Latex may be utilized to form a toner by any method within the purview of those skilled in the art. The latex emulsion may be contacted with an optional colorant, optionally in a dispersion, and other additives to form a toner by a suitable process, in embodiments, an emulsion aggregation (EA) and coalescence process.

Suitable resins may include a mixture of an amorphous polyester resin and a crystalline polyester resin as described in U.S. Pat. No. 6,830,860, the entire disclosure of which herein is incorporated by reference in entirety. Suitable resins may include a mixture of high molecular weight (HMW) amorphous and a low molecular weight (LMW) amorphous polyester resins.

The crystalline resin may be present, for example, in an amount of from about 1 to about 50 percent by weight of the toner components, from about 5 to about 35 percent by weight of the toner components. The crystalline resin may possess various melting points of for example, from about 30° C. to about 120° C., from about 50° C. to about 90° C. The crystalline resin may have a number average molecular weight (Mn), as measured by gel permeation chromatography (GPC) of, for example, from about 1,000 to about 50,000, from about 2,000 to about 25,000, and a weight average molecular weight (Mw) of, for example, from about 2,000 to about 100,000, from about 3,000 to about 80,000, as determined by GPC. The molecular weight distribution (Mw/Mn) of the crystalline resin may be, for example, from about 2 to about 6, from about 3 to about 5.

In embodiments, a suitable toner of the present disclosure may include two amorphous polyester resins and a crystalline polyester resin. The weight ratio of the three resins may be from about 30% first amorphous resin/65% second amorphous resin/5% crystalline resin, to about 60% first amorphous resin/20% second amorphous resin/20% crystalline resin.

In embodiments, a suitable toner of the present disclosure may include at least two amorphous polyester resins, an HMW resin and an LMW resin. As used herein, an HMW amorphous resin may have an Mw of from about 35,000 to about 150,000, from about 45,000 to about 140,000, and an LMW amorphous resin may have an Mw of from about 10,000 to about 30,000, from about 15,000 to about 25,000.

Colorants

One or more colorants may be added, and various known suitable colorants, such as dyes, pigments, mixtures of dyes, mixtures of pigments, mixtures of dyes and pigments, and the like, may be included in the toner. In embodiments, the colorant, when present, may be included in the toner in an amount of, for example, 0 to about 35% by weight of the toner, although the amount of colorant can be outside of that range.

As examples of suitable colorants, mention may be made of carbon black like REGAL 330® (Cabot), Carbon Black 5250 and 5750 (Columbian Chemicals), Sunsperse Carbon Black LHD 9303 (Sun Chemicals); magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™ or TMB-104™; and the like. As colored pigments, there can be selected cyan, magenta, yellow, red, green, brown, blue or mixtures thereof. Generally, cyan, magenta or yellow pigments or dyes or mixtures thereof, are used. The pigment or pigments are generally used as water-based pigment dispersions.

Wax

Optionally, a wax also may be used in forming toner particles. The wax may be provided in a wax dispersion, which may include a single type of wax or a mixture of two or more different waxes.

When included, the wax may be present in an amount of, for example, from about 1% by weight to about 25% by weight of the toner particles, from about 5% by weight to about 20% by weight of the toner particles, although the amount of wax can be outside of those ranges. Waxes that may be selected include waxes having, for example, an average molecular weight of from about 500 to about 20,000, from about 1,000 to about 10,000.

Waxes that may be used include, for example, polyolefins, such as, polyethylene including linear polyethylene waxes and branched polyethylene waxes, polypropylene including linear polypropylene waxes and branched polypropylene waxes, polyethylene/amide, polyethylenetetrafluoroethylene, polyethylenetetrafluoroethylene/amide, naturally occurring waxes such as those obtained from plant sources or animal sources, and polybutene waxes. Mixtures and combinations of the foregoing waxes may also be used, in embodiments. In embodiments, the waxes may be crystalline.

In embodiments, the wax may be incorporated into the toner in the form of one or more aqueous emulsions or dispersions of solid wax in water, optionally, with a surfactant, where the solid wax particle size may be in the range of from about 100 to about 500 nm.

Toner Preparation

The toner particles may be prepared by any method within the purview of one skilled in the art. Although embodiments relating to toner particle production are described below with respect to EA processes, any suitable method of preparing toner particles may be used, including, chemical processes, such as, suspension and encapsulation processes disclosed in U.S. Pat. Nos. 5,290,654 and 5,302,486, the disclosure of each of which herein is incorporated by reference in entirety.

In embodiments, toner compositions may be prepared by EA processes, such as, a process that includes aggregating a mixture of an optional colorant, an optional wax and any other desired or required additives, and emulsions including the resins described above, optionally in surfactants as described above, and then coalescing the aggregated mixture. A mixture may be prepared by adding an optional colorant and optionally a wax or other materials, which may also be optionally in a dispersion(s) including a surfactant, to emulsion resin, which may be a mixture of two or more emulsions containing a resin. The pH of the resulting mixture may be adjusted by an acid such as, for example, acetic acid, nitric acid and the like. The pH of the mixture may be adjusted to from about 2 to about 5. Additionally, in embodiments, the mixture may be homogenized. If the mixture is homogenized, that may be by mixing at about 600 to about 6,000 rpm. Homogenization may be accomplished by any suitable means, including, for example, an IKA ULTRA TURRAX T50 probe homogenizer.

Following preparation of the above mixture, an aggregating agent may be added to the mixture. Any suitable aggregating agent may be utilized to form a toner. Suitable aggregating agents include, for example, aqueous solutions of a divalent cation or a multivalent cation material. The aggregating agent may be, for example, an inorganic cationic aggregating agent, such as, polyaluminum halides, such as, polyaluminum chloride (PAC), or the corresponding bromide, fluoride or iodide, polyaluminum silicates, such as, polyaluminum sulfosilicate (PASS), and water soluble metal salts, including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate and combinations thereof.

In embodiments, the aggregating agent may be added to the mixture at a temperature that is below the Tg of the resin(s). The aggregating agent may be added to the mixture in an amount of, for example, from about 0.1% to about 10% by weight, from about 0.2% to about 8% by weight of the resin in the mixture.

The particles may be permitted to aggregate until a desired particle size is obtained. Particle size can be monitored during the growth process, for example, with a COULTER COUNTER, for average particle size. The aggregation may proceed by maintaining the elevated temperature, or slowly raising the temperature to, for example, from about 40° C. to about 100° C., and holding the mixture at that temperature for a time of from about 0.5 hours to about 6 hours, from about 1 hour to about 5 hours, while maintaining stirring, to provide the aggregated particles. Once the desired size is reached, an optional shell resin can be added.

Once the desired final size of the toner particles is achieved, the pH of the mixture may be adjusted with a base to a value of from about 3 to about 10, from about 5 to about 9. The adjustment of the pH may be utilized to freeze, that is, to stop toner particle growth. The base utilized to stop toner growth may include any suitable base, such as, for example, alkali metal hydroxides, such as, for example, sodium hydroxide, potassium hydroxide, ammonium hydroxide, combinations thereof and the like. In embodiments, a chelator, such as, ethylene diamine tetraacetic acid (EDTA), may be added to help adjust the pH to the desired values noted above.

Shell

In embodiments, after aggregation, but prior to coalescence, a resin coating may be applied to the aggregated particles to form a shell thereover. Any one or more resins may be utilized as the shell.

The shell resin may be applied to the aggregated particles by any method within the purview of those skilled in the art. In embodiments, the resins utilized to form the shell may be in an emulsion, including any surfactant described above. The emulsion may comprise resins, as known in the art or as described above.

Formation of the shell over the aggregated particles may occur while heating to a temperature of from about 30° C. to about 80° C., from about 35° C. to about 70° C. Formation of the shell may take place for a period of time of from about 5 min to about 10 hr, from about 10 min to about 5 hr.

The shell may be present in an amount of from about 10% by weight to about 40% by weight of the latex particles, from about 20% by weight to about 35% by weight of the latex particles, although amounts outside of those ranges can be used.

In embodiments, the final size of the toner particles may be less than about 8 µm, less than about 7 µm, less than about 6 µm in size.

Coalescence

Following aggregation to the desired particle size and application of any optional shell, the particles then may be coalesced to the desired final shape, the coalescence being achieved by, for example, heating the mixture to a temperature of from about 45° C. to about 100° C., from about 55° C. to about 99° C., which may be at or above the Tg of the resin(s) utilized to form the toner particles. Coalescence may be accomplished over a period of from about 0.01 to about 9 hours, from about 0.1 to about 4 hours.

After aggregation and/or coalescence, the mixture may be cooled to room temperature, such as, from about 20° C. to about 25° C. The cooling may be rapid or slow, as desired. A suitable cooling method may include introducing cold water to a jacket around the reactor. After cooling, the toner particles optionally may be washed with water and then dried. Drying may be accomplished by any suitable method for drying, including, for example, freeze-drying.

Additives

In embodiments, the toner particles may contain other optional additives, as desired or required. For example, the toner may include positive or negative charge control agents, for example, in an amount of from about 0.1 to about 10% by weight of the toner, from about 1 to about 3% by weight of the toner. Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which herein is incorporated by reference in entirety; organic sulfate and sulfonate compositions, including those disclosed in U.S. Pat. No. 4,338,390, the disclosure of which herein is incorporated by reference in entirety; cetyl pyridinium tetrafluoroborates; distearyl dimethyl ammonium methyl sulfate; aluminum salts, such as, BONTRON E84™ or E88™ (Orient Chemical Industries, Ltd.); combinations thereof and the like.

There can also be blended with the toner particles external additive particles after formation including flow aid additives, which additives may be present on the surface of the toner particles. Examples of the additives include metal oxides, such as, titanium oxide, silicon oxide, aluminum oxides, cerium oxides, tin oxide, mixtures thereof and the like; colloidal and amorphous silicas, such as, AEROSIL®, metal salts and metal salts of fatty acids inclusive of zinc stearate and calcium stearate, or long chain alcohols, such as, UNILIN 700, and mixtures thereof.

Each of the external additives may be present in an amount of from about 0.1% by weight to about 5% by weight of the toner, from about 0.25% by weight to about 3% by weight of the toner, although the amount of an additive can be outside of those ranges.

Suitable additives include those disclosed in U.S. Pat. Nos. 3,590,000, 3,800,588 and 6,214,507, the disclosure of each of which herein is incorporated by reference in entirety.

In embodiments, the dry toner particles having a shell of the present disclosure, exclusive of external surface additives, may have the following characteristics: (1) volume average diameter (also referred to as, "volume average particle diameter,") of from about 3 to about 25 μm; (2) number average geometric size distribution ($GSD_n$) and/or volume average geometric size distribution ($GSD_v$) of from about 1.05 to about 1.55; and (3) circularity of from about 0.93 to about 1, (as measured with, for example, a Sysmex FPIA 2100 analyzer). The characteristics of toner particles may be determined by any suitable technique and apparatus, such as, a Beckman Coulter MULTISIZER 3.

A toner of interest comprising a crystalline resin produced as described herein may be used in any known xerographic or electrophotographic device, or other imaging device.

The subject matter now will be exemplified in the following non-limiting examples. Parts and percentages are by weight unless otherwise indicated.

EXAMPLES

Example 1

Reused Distillate I and DIW for Distillate II (No Amm III)

Six parts MEK, 1 part IPA, 0.16 parts ammonia $NH_4OH$ (I), and 5 parts DIW I were weighed and charged into a 2 L flask under 150 rpm to form a mixture. Ten parts crystalline polyester resin with an acid value (AV) of 10.4 were added to the flask with 250 rpm. The batch temperature was set at 65° C. After 30 min at 65° C. to dissolve the resin, another 0.31 parts fresh 10% $NH_4OH$ solution (Amm II) were charged into the resin dispersion within 2 min. The neutralization ratio was calculated as 10% $NH_3$, and the amount of 10% $NH_3$ in parts was calculated based on the following equation:

10% $NH_3$-neutralization ratio*amount of resin in parts*AV*0.303*0.01.

A neutralization ratio of 149% was used. The mixture was stirred for 10 min. Then, 15 parts DIW II at 65° C. were pumped into the flask within 60 min. The formula is listed in Table 1.

TABLE 1

Formulation for CPE solvent reuse

| Chemicals | Parts | Percentage (%) | Quantity (g) |
|---|---|---|---|
| CPE Resin | 10.0 | 26.69 | 200 |
| ¹MEK | 6.0 | 16.01 | 120 |
| ¹IPA | 1.0 | 2.67 | 20 |
| ¹Amm I | 0.16 | 0.4 | 3.2 |
| ¹DIW I | 5 | 13.34 | 100 |
| Amm II | 0.31 | 0.8 | 6.2 |
| ²DIW II | 15 | 40.03 | 300 |
| Total | 37.5 | 100.00 | 749.4 |

¹Items in distillate I and
²items in distillate II.

The emulsion produced after DIW II had a particle size, $D_{50}$, of 148 nm as measured by a Nanotrac particle size analyzer. $D_{95}$ and width were used to evaluate the particle size distribution, which data are provided in Table 3.

Example 2

Reused Distillate I and Remanufactured Distillate II

The materials and method of Example 1 were practiced to obtain a resin mixture prior to phase inversion.

According to the distillate composition measured by GC (Table 2), distillate II contains 2.76 wt % MEK, 4.27 wt % IPA, 0.0943 wt % Amm III and 92.88 wt % DIW.

TABLE 2

Distillate composition measured by GC

| | MEK (wt %) | IPA (wt %) | $NH_3$ (wt %) | DI water (wt %) |
|---|---|---|---|---|
| Distillate I | 59.21 | 7.56 | 0.1915 | 32.12 |
| Distillate II | 2.16 | 4.27 | 0.0943 | 92.88 |

Fifteen parts distillate II were prepared with fresh MEK, IPA, ammonia and DIW based on the data presented in Table 2, heated to 65° C. and pumped into the flask containing the resin mixture within 60 mm to induce phase inversion. The O/W emulsion produced after prepared distillate II was added had a particle size, $D_{50}$, of 156 nm as measured by a Nanotrac particle size analyzer. Data of particle size and population are presented in Table 3.

Example 3

Real Distillates I and II

Distillate I from a PIE was weighed and compensated with fresh chemicals to achieve the amounts according to the formula for Distillate I in Table 1. Otherwise, the materials and method of Example 1 were practiced to form a resin mixture.

Distillate II from a PIE was analyzed and supplemented as needed based on the formula for Distillate II of Table 2. Then, 15 parts of the so produced Distillate II replaced the DIW II in the formulation of Table 1 were heated to 65° C. and pumped into the flask containing the dissolved resin within 60 min. The emulsion produced after Real Distillate II induced phase inversion had a particle size, $D_{50}$, of 151 nm as measured by a Nanotrac particle size analyzer. The data of particle size and population are presented in Table 3.

TABLE 3

Particle size data

| Sample | $D_{50}$ (nm) | $D_{95}$ (nm) | Width (nm) |
|---|---|---|---|
| Example 1 | 148 | 234 | 80 |
| Example 2 | 156 | 290 | 110 |
| Example 3 | 151 | 251 | 90 |

From Table 3 it was observed that compared with the latex of Example 1 which was completed with pure DIW and no Amm III, the latex produced in Examples 2 and 3, completed with either prepared Distillate II or real Distillate II, have consistent particle size. That suggests the resin neutralization ratio primarily is based on Amm I (from Distillate I) and Amm II (fresh charged ammonia). Amm III may be ignored and has minimal impact on final particle size. Considering the high sensitivity of CPE particle size to base amount, both Distillates I and II can be used in a CPE PIE and only Amm I and II need be considered for calculating the resin neutralization ratio. The results also establish that reused base amount and resin neutralization ratio may be used to control CPE latex particle size.

It will be appreciated that various of the above-disclosed and other features and functions, or alternatives thereof, may be desirably combined into many other different systems or applications. Also various presently unforeseen or unanticipated alternatives, modifications, variations or improvements therein may be subsequently made by those skilled in the art, which are also intended to be encompassed by the following claims. Unless specifically recited in a claim, steps or components of claims should not be implied or imported from the specification or any other claims as to any particular order, number, position, size, shape, angle, color or material.

All references cited herein are herein incorporated by reference in entirety.

We claim:

1. A phase inversion emulsification (PIE) method comprising:
   a) adding to an organic mixture comprising a first concentration of a solvent and a base, a crystalline polyester (CPE) resin comprising one or more acid groups;
   b) dissolving said CPE in said organic mixture to form a dispersion;
   c) neutralizing said one or more acid groups by adding a base to said dispersion to form a neutralized dispersion; and
   d) adding an aqueous mixture and optional water to said neutralized dispersion to obtain a phase inversed oil-in-water (O/W) emulsion comprising CPE resin particles; wherein said organic mixture and said aqueous mixture are obtained from a previous PIE.

2. The PIE method of claim 1, wherein additional solvent and/or base are added to said organic mixture.

3. The PIE method of claim 1, wherein base is present in said aqueous mixture in an amount up to about 0.1 wt %.

4. The method of claim 1, wherein the CPE resin is selected from the group consisting of poly(ethylene-adipate), poly (propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly (hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(nonylene-decanoate), poly(octylene-adipate), poly(ethylene-adipamide), poly(propylene-adipamide), poly(butylenes-adipamide), poly(pentylene-adipamide), poly(hexylene-adipamide), poly(octylene-adipamide), poly(ethylene-succinimide), poly(propylene-sebecamide), poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), poly(butylene-succinimide), and combinations thereof.

5. The PIE method of claim 1, wherein said CPE resin may be a polyester resin having an acid number from about 2 mg KOH/g of resin to about 200 mg KOH/g of resin, from about 5 mg KOH/g of resin to about 50 mg KOH/g of resin, or from about 10 mg KOH/g of resin to about 15 mg KOH/g of resin.

6. The PIE method of claim 1, wherein said solvent is selected from the group consisting of alcohols, esters, ethers, ketones, amines and combinations thereof.

7. The PIE method of claim 1, wherein said solvent is selected from the group consisting of methanol, ethanol, propanol, isopropyl alcohol (IPA), butanol, ethyl acetate, methyl ethyl ketone (MEK) and combinations thereof.

8. The PIE method of claim 1, wherein said solvent comprises two solvents in a ratio from about 1:2 to about 1:15, from about 1:2.5 to about 1:12.5, from about 1:3 to about 1:10, or from about 1:3.5 to about 1:7.5.

9. The PIE method of claim 1, wherein the base is selected from the group consisting of ammonium hydroxide, potassium hydroxide, sodium hydroxide, sodium carbonate, sodium bicarbonate, lithium hydroxide, potassium carbonate and combinations thereof.

10. The PIE method of claim 1, wherein said steps occur at a temperature above room temperature.

11. The PIE method of claim 1, further comprising the step:
   (e) removing fluids from said O/W emulsion.

12. The PIE method of claim 11, wherein said fluids comprise two fractions.

13. The PIE method of claim 12, wherein a first fraction comprises said organic mixture and a second fraction comprises said aqueous mixture.

14. The PIE method of claim 11, wherein said removing comprises distilling.

15. The PIE method of claim 14, wherein distilling occurs under vacuum.

16. The PIE method of claim 11, further comprising the step:
   (f) separating CPE resin particles from said O/W emulsion.

17. The PIE emulsion of claim 16, further comprising the step:
   (g) washing said CPE resin particles with water to produce a CPE latex.

18. The PIE method of claim 17, further comprising the step:
   (h) combining said CPE latex with an amorphous resin and optionally a colorant and/or a wax to form a toner particle.

19. The PIE method of claim 1, wherein additional water is added to said aqueous mixture.

* * * * *